Jan. 22, 1935.  F. D. JONES  1,988,497
HAY PRESS
Filed April 7, 1932  2 Sheets-Sheet 1
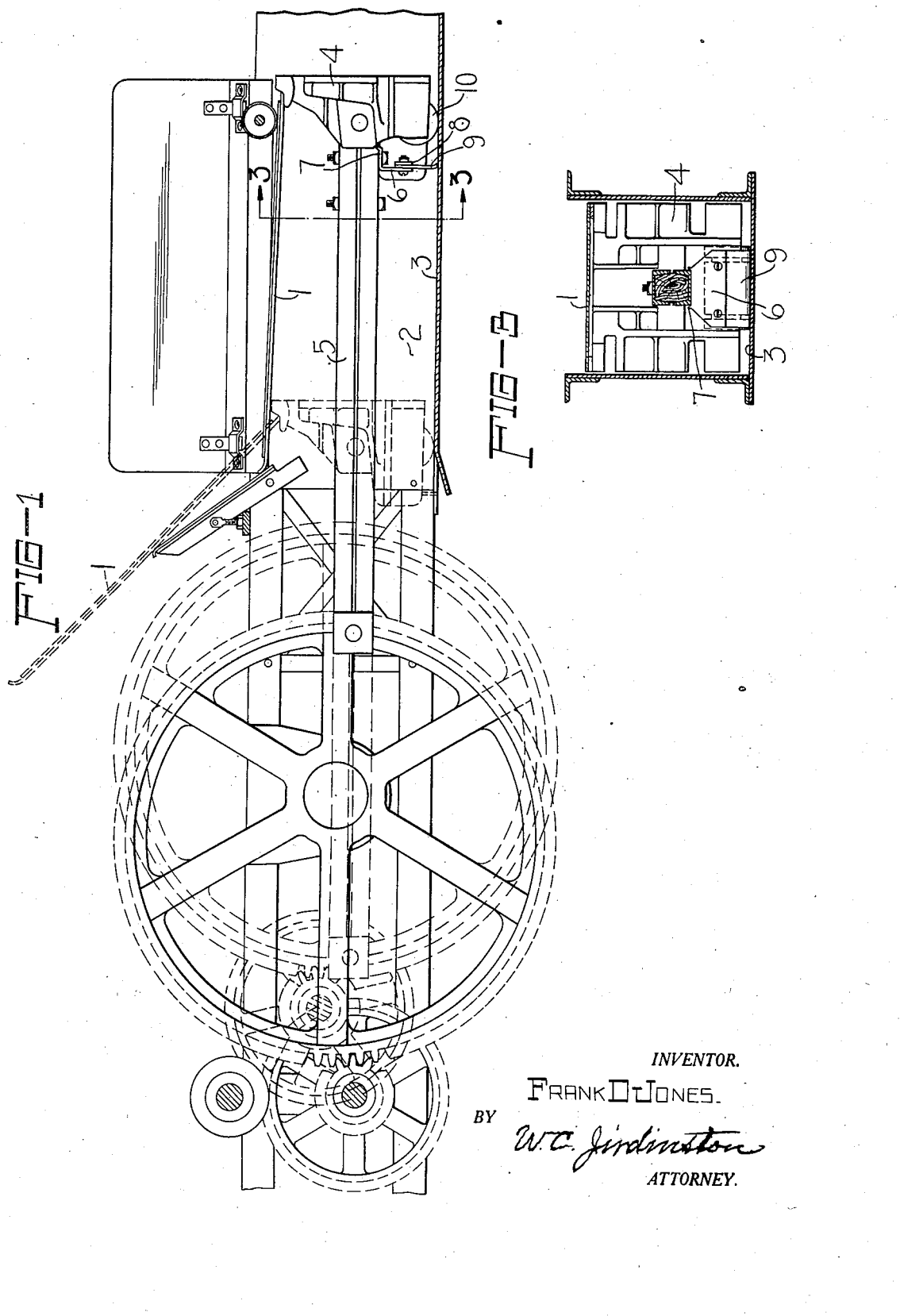
INVENTOR.
FRANK D. JONES.
BY
ATTORNEY.

Jan. 22, 1935.  F. D. JONES  1,988,497
HAY PRESS
Filed April 7, 1932  2 Sheets-Sheet 2
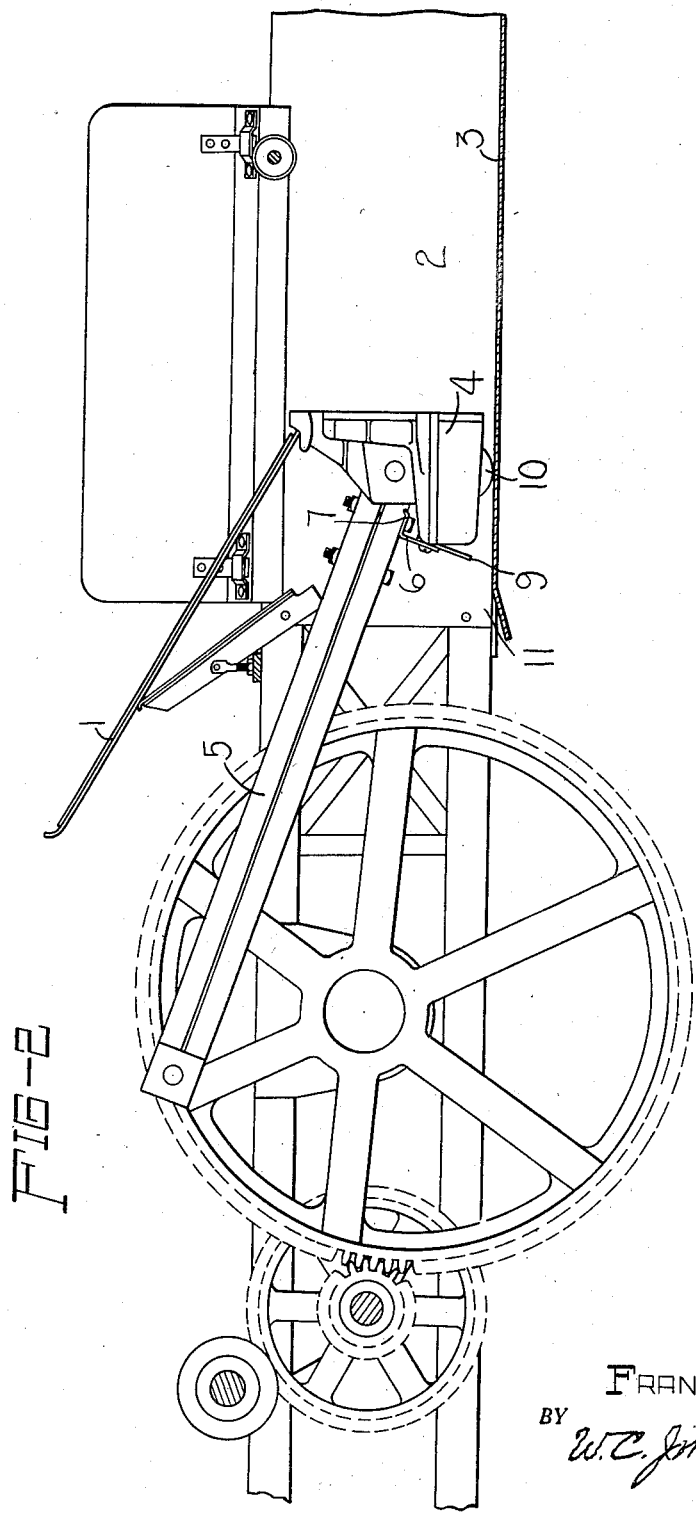
INVENTOR.
Frank D. Jones.
BY
ATTORNEY.

Patented Jan. 22, 1935

1,988,497

UNITED STATES PATENT OFFICE 1,988,497

HAY PRESS

Frank D. Jones, Ottumwa, Iowa, assignor to Dain Manufacturing Company of Iowa, Ottumwa, Iowa, a corporation of Iowa Application April 7, 1932, Serial No. 603,771

6 Claims. (Cl. 100—29)

My invention relates to hay presses and particularly to the receiving chamber thereof in the bottom of which chaff and dust is liable to accumulate when the press is in operation, and the object of my invention is to provide a means by which such chaff and dust is removed simultaneously with the retrogressive movement of the pitman.

Referring to the accompanying drawings in which similar numerals indicate identical parts—

Figure 1 is a longitudinal vertical section of the receiving chamber of a hay press, in which hay is fed to be pressed into the baling chamber, and shows the pitman at the termination of its compressing stroke with my attachment secured to the pitman and in operative position and illustrating, in dotted lines, the position of the parts at the termination of the retrogressive action of the pitman;

Figure 2 is a side elevation of Figure 1 and illustrates the position of the parts in initial movement of compression with my attachment out of operative position; and, Figure 3 is a section on the line 3—3 of Figure 1 showing my invention and its attachment to the pitman of the press.

In the operation of baling hay loose material such as leaves, pieces of stalks and dust are liable to sift down between the edges of the top plate 1 and the sides of the receiving chamber 2 and if allowed to accumulate on the floor 3 of the press, it will interfere with the perfect operation of the plunger 4 by the reciprocating action of which the bale is compressed.

The plunger 4 is operated by the pitman 5 which is actuated by power operated gearing as fully disclosed in Patent No. 1,153,199, dated September 14, 1915, and in which the pitman is attached to and operated by an eccentric gear of a type well known in the art.

My device consists of a plate 6 vertically disposed and having an upper bent portion 7 bolted to the under side of the pitman 5, and secured to the vertical portion of the plate 6, between the latter and a metallic strip 8, by suitable bolts, is a scraper 9 extending transversely of the receiving chamber 2 and slightly beyond the ends of the roller 10 which is journaled on the plunger 4 supporting the latter and traveling on the floor 3 of the receiving chamber 2.

As shown in Figure 1 the pitman 5 and plunger 4 are at the limit of the compressive movement and the scraper 9 is in contact with the floor 3 of the receiving chamber 2, it therefore follows that as the pitman and plunger recede the scraper is drawn along the floor of the chamber, and in contact therewith, carrying before it any debris that may have been deposited on the floor, in the baling operation, and ejecting it from the open end 11 of the receiving chamber, to fall to the ground, as shown in dotted lines in Figure 1. At this point in the operation the pitman is at the limit of its retrogressive movement and, actuated by the gearing, begins to swing upward on its pivotal connection with the plunger head, and as it rises the scraper is lifted out of operation, as shown in Figure 2, and does not again assume an operative position on the floor 3 until the pitman and plunger have reached the limit of their compressing movement.

I make the scraper 9 from discarded belting as a preferable material for the purpose, although any material may be used possessing sufficient flexibility, stiffness and durability.

What I claim is:—

1. In a hay press, the combination with the receiving chamber, of a plunger in the chamber, a reciprocating pitman connected to the back of said plunger to actuate the plunger, and means adjacent the back of said plunger and controlled by rearward movement of said pitman to remove debris from the floor of the chamber.

2. In a hay press, the combination with the receiving chamber, of a plunger in the chamber, a reciprocating pitman connected to the back of said plunger to actuate the plunger, and a scraper secured to the pitman adjacent the back of said plunger and controlled by rearward movement of the pitman to remove debris from the floor of the chamber.

3. In a hay press, the combination with the receiving chamber, of a plunger in the chamber, a reciprocating pitman connected to the back of said plunger to actuate the plunger, and a scraper secured to the under side of the pitman adjacent the back of said plunger and operated by rearward movement of the pitman to remove debris from the floor of the chamber.

4. In a hay press, the combination with the receiving chamber, of a plunger in the chamber, a reciprocating pitman connected to the back of said plunger to actuate the plunger, and a scraper secured to the pitman adjacent the back of said plunger and operated by rearward movement thereof to contact with the floor of said chamber to the termination of said movement, and raised from contact with the floor of the chamber with the movement of the pitman in the opposite direction.

5. In a hay press, in combination with a receiving chamber, a reciprocating plunger in the chamber, operating mechanism including a rotating crank pin, the path of rotation of said crank pin being in a vertical plane and the direction of rotation of said crank pin being toward said plunger when moving through the upper portion of its path, and a pitman pivotally connected to said crank pin at one end and to said plunger at the other for transmitting reciprocatory movement to said plunger from the rotary movement of said crank pin, of a scraper carried by said pitman at a point spaced from the point of pivotal connection of the pitman with the plunger whereby said scraper will contact the bottom of the chamber when the plunger is moved rearwardly and will be lifted above the bottom of the chamber when the plunger is moved forwardly.

6. In a hay press, in combination with a receiving chamber, a reciprocating plunger in the chamber, operating mechanism including a rotating crank pin, the path of rotation of said crank pin being in a vertical plane and the direction of rotation of said crank pin being toward said plunger when moving through the upper portion of its path, and a pitman pivotally connected to said crank pin at one end and connected to said plunger at the other end for transmitting reciprocatory movement to said plunger from the rotary movement of said crank pin, of a scraper carried by said pitman adjacent said plunger, said scraper being disposed to contact the bottom of the chamber when the plunger is moved rearwardly and to be lifted above the bottom of the chamber when the plunger is moved forwardly.

FRANK D. JONES.